Oct. 18, 1966    W. S. MILLER    3,279,314
HIGH CONTRAST PROJECTION SCREENS
Filed Oct. 23, 1965    2 Sheets-Sheet 1
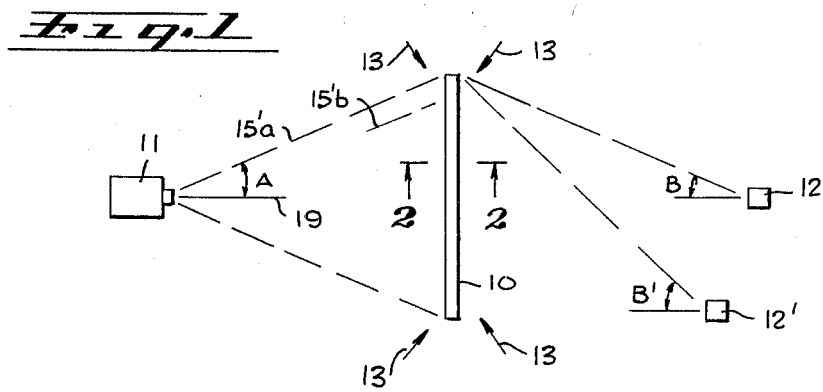
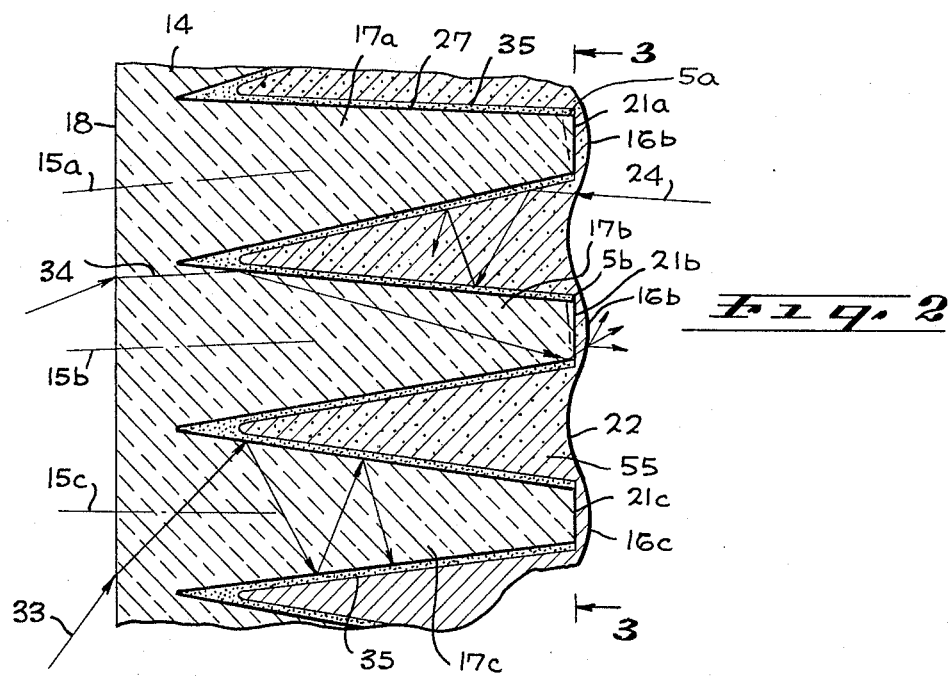
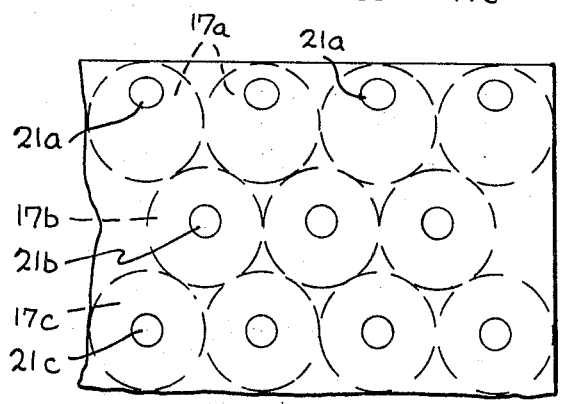
INVENTOR.
WENDELL S. MILLER

WENDELL S. MILLER
INVENTOR.

3,279,314
HIGH CONTRAST PROJECTION SCREENS
Wendell S. Miller, 1341 Comstock Ave.,
Los Angeles, Calif.
Filed Oct. 23, 1965, Ser. No. 503,051
5 Claims. (Cl. 88—28.93)

The present application is a continuation-in-part of my copending application, Serial No. 288,097 filed June 17, 1963, which itself is a continuation-in-part of Serial No. 204,838, filed June 25, 1962 on "Rear Projection Screen."

This invention relates to an improved type of projection screen, primarily designed for use as a rear projection screen, that is, a screen adapted to have an image projected onto it from a location at the back of the screen, with the image then being transmitted through the screen for viewing from its front side.

In many instances in which rear projection screens are utilized, it is desirable to be able to use the screens, and view images on them, even through there may be a substantial amount of ambient light or reflected light falling on the screen in addition to that of the image. Such ambient or reflected light, however, tends to illuminate the areas of the image which are intended to be black, in the case of most conventional screens, and therefore decreases the contrast in the image as viewed. This effect may be combatted either by increasing the efficiency of transmittance of light from the projector through the screen to the viewer or by reducing the intensity with which ambient light is directed by the screen to the viewer.

In conventional screens if the first course of action is followed the screen tends to become highly directive and possesses a very small bend angle of itself resulting in a sharp drop-off in brightness the edges of the screen or for off-axis viewers. With low efficiency diffusing screens a Fresnel lens may be employed to combat this effect but such lenses tend to produce objectionable moire effects with image dissecting screens of the lenticulated type.

By providing a transmission screen with an internal light trap the second method of contrast enhancement may be achieved. There is shown herein a method of incorporating a structure in the screen itself which progressively increases the bend angle in proportion to the distance from the center of the screen. In the preferred form of this invention this effect is augmented by the inclusion of an internal light trap which further enhances the contrast obtainable by eliminating the reflection of ambient light from the viewed surface of the screen. A modification of this trapping system further provides a smoother viewing face sufficiently uneven to break up Fresnel surface reflections.

It is an object of this invention to provide a screen whose inherent bend angle capability increases while moving from the center toward the edge.

Another object of the present invention is to provide an improved type of rear projection screen which is so designed as to substantially completely eliminate the above discussed tendency for loss of contrast in a projected image as a result of the impingement of stray light on the screen. As will appear, a screen embodying the invention is so constructed as to virtually ignore the presence of stray light in the area, either in front of or behind the screen, so that even though the viewing area and projection area are lighted relatively brightly, a projected image on the screen still appears to a viewer in sharp contrast, with the black or dark areas of the image being just as dark as if in a completely darkened room.

In designing the screen of the present invention, a major problem has been that of so constructing the screen as to avoid the development of abnormally bright spots or areas and other abnormally dark areas in the projected image. More specifically, it has been found that, in the particular type of structure which I prefer to utilize for attaining the basic purpose of avoiding response to ambient light, there is an inherent tendency to produce an ultimate image, which when viewed from any viewing location, has an excessively illuminated "bright spot" at one point in direct line with the projector, and has a darkened area surrounding that bright spot, thus eliminating the usefulness of the apparatus unless this effect is in some way eliminated. Consequently, a highly important specific object of the invention is to provide means for avoiding the discussed bright spot and surrounding dark area effect, to attain a projected image in which all areas are illuminated in proper proportion to the lightness or darkness of the corresponding points on the film in the projector.

A related defect of rear projection screens which it is an object of this invention to overcome is the tendency of the farther side of a transmission screen to appear less luminous than the side nearer an off-axis viewer. To an on-axis viewer this effect is seen as a central hot spot. It results from the fact that the total bend angle (i.e. the angle subtended at the screen between light from the projector and light to the viewer) is greater for such positions on the screen. It will be seen that this is accomplished by centerally inclining the axes of eccentric light guides of the screen to have their axes coincident at the desired position of the projector, and by so truncating such light guides at their viewing ends that they are each provided with a reflective lip which centerally directs the output of light from the tip.

Structurally, a screen constructed in accordance with the invention includes a large number of light guides distributed at different locations across the face of the screen, and positioned to receive different portions of the projected image and transmit those portions through the thickness of the screen to its viewing side. These light guides have reflective side walls which reflect inwardly light passing through the guides. Also, these guides taper in advancing from the projection side of the screen toward its viewing side, to form relatively large cross-section inlet ends of the guides near the projection side, and smaller cross-section outlet ends near the viewing side. The small cross-section outlet ends of the different light guides form a large number of minute spaced illuminated areas which are seen by the viewer, and which form together a composite visible image. Between and about the small illuminated areas, the visible side of the screen is preferably formed of a material capable of giving to the screen the discussed non-reflective characteristics. This material may be defined broadly as having a visible surface of low diffuse albedo, preferably less than 10%.

The tapering configuration of the light guides enables each individual guide to pick up light from a relatively large area at the projection side of the screen, and guide that light into the desired very small visible area at the viewing side of the screen. Also, the taper of the guides causes them to reflect stray light away from the screen without transmitting it through the screen to its viewing side.

The elimination of bright spots and/or abnormally dark areas in the projected image is attained by designing the various light guides to diffusely scatter the light which passes therethrough to a limited extent, in a manner distributing the light emitted from the outlet end of each guide over the viewing range, and with a uniformity overcoming the natural tendency for bright spots etc. While, as will appear, this diffusion of the light rays may be effected in different ways, it is preferred that the diffusion be produced by interposition of a translucent material at the outlet end of each light guide.

To maximize the absorption of light falling on the screen from its viewing side, the light absorptive material may take the form of a thin layer or coating of absorbent paint or the like, which follows the contours of the light guide structure into a large number of recesses or valleys formed between different light guides, so that there is a light trapping effect within these recesses, as well as the light absorptive effect of the paint itself.

The above and other features and objects of the present invention will be better understood from the following detailed description of the typical embodiments illustrated in the accompanying drawings, in which:

FIGURE 1 is a diagramatic representation of the system in which the screen is used.

FIGURE 2 is a section along the lines 2–2 of FIGURE 1 of one form of the screen of this invention.

FIGURE 3 is an elevational view of the face of the screen of FIGURE 2.

Figure 4:
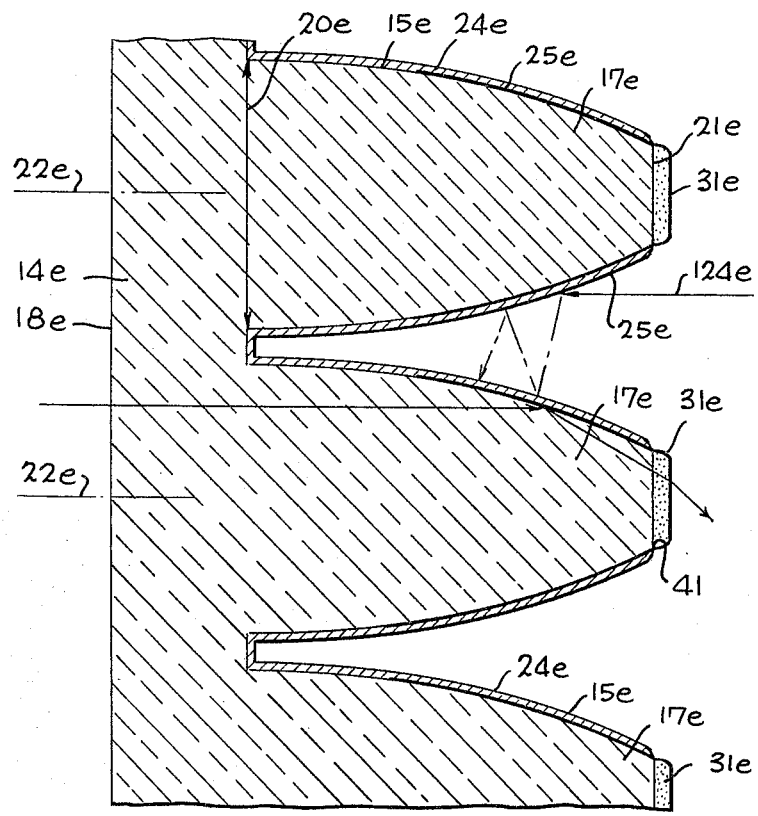
FIGURE 4 is a sectional view generally along the lines 2–2 of FIGURE 1 of the central portion of a variational form of the screen.

In FIGURE 1 I have represented a screen 10 embodying the invention with a projected image being directed upon its left side by a conventional projector 11. The image projected on screen 10 is viewed from the right side by viewers whose positions may variously be represented as axial at 12 or extra-axial at 12′. In the FIGURE 1 arrangement it may be assumed that ambient light of substantial intensity falls on the screen on both its front and rear sides, typically striking the screen in various directions indicated by the arrows 13. The purpose of the unique construction of the screen is to provide a uniformly illuminated image to a viewer in any of the various positions 12, 12′ substantially free of dilution by ambient light coming from directions other than that of the projector 11. The functions to be accomplished by the screen are threefold: the trapping and absorbtion of ambient light, the uniform distribution of light from each image element of the screen throughout the angular region through which it is intended to be viewed, and the convergence of such angular viewing regions to provide freedom from excessive decrease in brightness of image elements requiring greater than average bend angle.

As seen in FIGURE 2, screen 10 is formed essentially of a continuous sheet like transparent body 14 having a smooth essentially planer input surface 18 and a large number of tapering light guides 17a, 17b, 17c formed integrally with the sheet 14 on the side opposite input surface 18. The light guides preferably made of the same transparent material as sheet 14 for which purpose glass or polymethyl methacrylate will suffice. As illustrated, the light guides taper, decreasing in section in passing from sheet 14 to their respective light outlet ends 21a, 21b, and 21c. In this figure the taper is indicated to be linear so that the guides are in the form of truncated cones. In practice each of the guides would be of such size as to be below the visual limit of resolution of an observer in the intended audience area. A screen for acceptable image reproduction thus comprises in excess of 5 million such light guides over the extent of its surface. Finer definition may be obtained with more, and coarser definition with fewer guides.

Each of the guides is made to be internally reflecting at least for light entering the screen base 18 from the general direction of projector 11. This may be accomplished by providing a metallic mirror 27 on the guiding surfaces of each guide as shown in FIGURE 2, or as subsequently shown in FIGURE 4 and described in the above cited prior applications. By providing metallic reflecting surface only near the outlet ends of the guides and relying upon total internal reflection to constrain the projected light near the inlet ends contiguous to sheet 14, a meridional ray 34 parallel to the axis of light guide 17b is seen in the figure to be reflected twice by the walls of the guide 17d before its eventual emission from the outlet end 21b thereof. It will be apparent that other parallel rays may be reflected once or not at all during through the guide, and that skew rays from the projector may be reflected a greater number of times by virtue of the well-known "whispering mode" effect during their passage through the guide. It is thus of considerable importance that the efficiency of reflection at the surface of the guide be maximized in order to prevent undue loss of intensity in the projected beam.

Only light entering guide approximately on axis will be efficiently transmitted therethrough and then of course only if the guides are not too long. For this reason I prefer that their longitudinal extent should not be greater than 10 times the diameter of the outlet faces 21a, 21b, and 21c. Strongly extra-axial light 33 striking the rear surface 18 of the sheet 14 will be refracted into the screen at a substantial angle to the axes of the light guides. Such light will strike the reflective surfaces of the guides initially at so great an angle that upon repeated reflection it will not reach the output end, typically 21c of a guide 17c, but rather will be reflected back out through the input face 18. The illustrated meridional ambient ray 33 is shown to be one such that upon repeated reflection it finally intercepts the reflective surface of guide 17c normally at 20 and is returned back along its original entry path.

Prior art screens have shown structure which appear superficially similar to the light guides described here but which actually rely for their convergence of the projector light upon refractive lenticulations at surface 18. Such systems are not only extremely difficult to produce in accurate registry but they fail to produce the scattering provided by the above mentioned multiple reflection of the projected beam within the guide, and further increase the effective angle for transmittance therethrough of ambient light such as ray 33 incident upon the rear of the screen structure.

To provide freedom from extraneous reflection of ambient light off of the viewing surface of the screen, I provide a dark, light absorbing covering 35 obscuring the reflective surface 27 from the audience area. This covering 35 may be thick enough to fill in the region between the light guides as is shown in the above cited applications, or it may be a thin layer as illustrated in FIGURES 2 and 4 closely conforming to the surface of the guides.

Light from the projector emanating from tapering guides will in general vary sharply in intensity throughout the angular region containing the audience area due to the fact that different solid angular regions will be supplied with light from the projector after a different number of reflections, or lack thereof from the surface of the guide. A substantial amount of smoothing of this hotspot producing effect is obtained by the use of guides such as those of FIGURE 2 which deliver projected light to their output ends through a variety of modes requiring different numbers of reflection. However, the overlapping of these modes is not sufficient of itself to completely free the output image from the tendency to exhibit hotspots or regions of uneven information to the audience area. It is therefore essential for proper performance of such screen that the output end of each light guide be provided with a diffusing means in the form of a physical structure capable of scattering transmitted light through a small angular deviation. In the device of FIGURE 2 this function is provided by a layer of translucent lacquer covering the tips of the light guides as illustrated at 16a, 16b and 16c respectively. This lacquer may effectively cover also the light absorbing coating 35, filling in the regions between the light guides to prevent the accumulation of lint, dust and the like. I prefer to use a lacquer having a volatile solvent component which promotes some shrinkage of the resulting film upon drying. This causes the gross surface 22 of the screen to be generally undulating in character and thus prevents the formation of any consistent imagery of bright sources on the viewing side due to Fresnel reflection at the interface between the lacquer covering and air.

Ambient light 24 falling on the viewing side of the screen from the audience area is transmitted, somewhat scattered, into the light trapping structure provided by the layer 35 on the light guides 17a, 17b, etc.

As illustrated in FIGURE 2 the axes 15a, 15b, and 15c of light guides 17a, 17b, and 17c respectively are directed on generally convergent paths which, with due allowance for refraction, converge as shown in FIGURE 1 at the desired position of the projector. Pencils of light from the projector directed toward the position of the respective guides therefor enter these guides essentially axially interior to the screen 10. In forming the screen, preferably by casting, the outlet faces 21a, 21b, and 21c of the guides are made parallel to surface 18. Therefore, the guides eccentrically located with respect to the axis of projection 19 in FIGURE 1 find themselves provided with an asymmetric lip 5a and 5b respectively on the portion of the guide remote from axis 19. The function of the lip will be brought out in the discussion of FIGURE 5.

In FIGURE 3 is shown the decrease in the relative area of guides 17a, 17b, and 17c on proceeding from their input ends to their output ends 21a, 21b, and 21c. It is also apparent that the relative positioning of the output end progressively changes from a symmetrical disposition on axis 19 at 21c to an asymmetric position off-axis at 21a. The scale of this picture is of course strongly distorted for purposes of representation. Instead of three rows of guides exhibiting this amount of deviation there typically would be 500 such rows.

In FIGURE 4 there is exhibited in greater detail the central portion of a variational form of the screen of this invention in which the shape of the light guides is essentially paraboloidal rather than conical. Here sheet 143 is of transparent plastic exhibiting a planer entrance face 18e. Guides 17e have large area entrance portions 20e and small area outlet portions 21e each provided with a translucent scattering member 31e in the path of light transmitted therethrough. These guides are provided with a metallically reflective portion 24e near the outlet ends and a dark absorbing layer 15e of smaller refractive index than the material of guide 17e. The absorbtive material 15e covers the surface of the guide near end 20e as well as the reflective coating 24e. As in the form of FIGURE 2, ambient light 124e is trapped in the labyrinth provided by the dark coating 25e on the light guide 17e.

Reflection of light from the projector on the walls of the light guides is obtained through total internal reflection at 15e near the entrance and, further along by metallic reflection from coating 25e. Such paraboloidal shaped light guides in general provide only one reflection for projected light and thus while they may be shorter than the corresponding conical guides tend to be more afflicted with hotspot problems.

Figure 5:
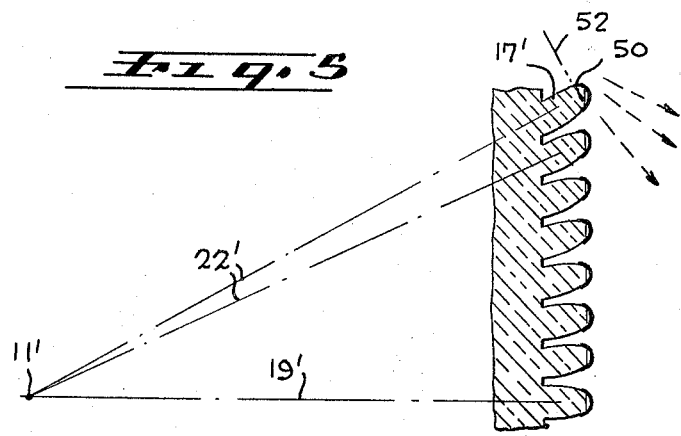
FIGURE 5 is a sectional view of a screen of the type of FIGURE 4 shown in less detail to bring out the overall orientation of the light guide and in particular the conformation of bend angle increasing lips of the extra axial guides. This shows the manner in which projected light tends to be automatically directed inwardly toward a central viewing location.

In FIGURE 5 the detail of the lips corresponding to 5a, 5b, etc. of FIGURE 2 may be more readily appreciated. A typical lip 50 on a screen of the form of FIGURE 4 is shown. It will be readily appreciated that light coming from the corresponding position of the projector at 11' along axes 22' would be symmetrically distributed by guide 17' were that guide to be truncated along a plane 52 perpendicular to its axis. However, the existence of lip 50 causes reflection inwardly toward projection axis 19' of light which would otherwise be scattered away from 19'. Referring back to FIGURE 1 to appreciate the operation of these lips, an observer at 12 would see an image element at the extreme edge of screen 10 by means of light deviated through an angle equal to the sum of angles A and B which such peripheral element of the screen subtends respectively from the axis 19 at points 11 and 12. This sum is obviously zero for light passing axially through the center of the screen from 11 to 12, and reaches a maximum at the extreme edges of the screen. Consequently in conventional screens the brightness at the center appears greater than at the edges for axial viewing. This effect is more pronounced when the viewing position is at 12' substantially off-axis. In that case the bend angle corresponds to $A+B'$ for viewing the further edge of the screen. At the same time the bend angle at the nearer edge of the screen is less for the off-axis viewer at 12' than it would be for a viewer on-axis at 12. The provision of the reflective lip typically 50 of FIGURE 5 on the light guides tends to compensate for this effect by directing the light preferentially inwardly.

The preferred form of the screen described has a perfectly planer entrance face. In general this criterion is not absolutely necessary. Some overall curvature of the entrance face 18 may be tolerated or even desired to assure convergence of the light guide axes 15a etc. upon slightly varied positions of the projector 11. What is essential is that the surface 18 would be essentially planer-in-the-small. That is to say it should offer negligible refractive power with respect to the convergence of light entering the individual light guides. Such a surface I would term essentially flat.

I claim:

1. A rear projection screen having an essentially flat first side onto which an image may be projected, and a second side from which said image may be viewed, said screen comprising a sheet of essentially transparent material having lugs forming a large number of light guides positioned to receive and transmit different portions of said image between said sides, individual light guides each defining its own axis, said individual light guides having side walls inwardly reflective near said first side of said screen for light essentially aligned with said axes and inwardly reflective of all light near said second side of said screen, said guides narrowing while advancing from said first side of the screen toward said second side to form large cross-section inlet ends of said guides near said first side of the screen and smaller cross-section outlet ends near said second side of the screen, said light guide axes collectively converging in the direction of said first side of the screen, each of said guides whose axis makes an acute angle with said essentially flat entrance surface at said first side having a greater axial extent of said inwardly reflective side wall at said second end in the direction of said acute angle than in the direction of its supplement, each of said guides being provided at said second side of the screen with translucent light diffusing material positioned in the path of light emitted from said guide.

2. A rear projection screen as set forth in claim 1 wherein said light guides are essentially conical in shape.

3. A screen as set forth in claim 1 wherein said second side of said screen is covered with a dark, light absorbing material at all points except the outlet ends of said light guides.

4. A screen as set forth in claim 1 wherein said diffusing material comprises a coating of translucent material further occupying the space at the second side of said screen between said light guides and providing an undulatory surface at said second side.

5. A rear projection screen as set forth in claim 1 wherein said light guides are of essentially paraboloidal form.

No references cited.

JULIA E. COINER, *Primary Examiner.*